United States Patent
Thiele

(10) Patent No.: US 7,222,960 B2
(45) Date of Patent: May 29, 2007

(54) SPECTACLE FRAME

(75) Inventor: Jens Frederik Anton Thiele, Charlottenlund (DK)

(73) Assignee: F.A. Thiele A/S, Hvidovre (DK)

( * ) Notice: Subject to any disclaimer, the term of this patent is extended or adjusted under 35 U.S.C. 154(b) by 138 days.

(21) Appl. No.: 10/513,107

(22) PCT Filed: May 1, 2003

(86) PCT No.: PCT/DK03/00282

§ 371 (c)(1),
(2), (4) Date: Mar. 18, 2005

(87) PCT Pub. No.: WO03/093894

PCT Pub. Date: Nov. 13, 2003

(65) Prior Publication Data

US 2005/0157253 A1     Jul. 21, 2005

(30) Foreign Application Priority Data

May 2, 2002   (EP) ................... 02388033
Dec. 17, 2002 (EP) ................... 02388077

(51) Int. Cl.
*G02C 5/22* (2006.01)
(52) U.S. Cl. .................. 351/153; 351/116; 16/228
(58) Field of Classification Search ............... 351/153, 351/111, 90, 92, 103, 106, 83, 86, 116, 158, 351/41; 16/228
See application file for complete search history.

(56) References Cited

U.S. PATENT DOCUMENTS

| | | | |
|---|---|---|---|
| 4,494,834 A | 1/1985 | Tabacchi | |
| 5,517,258 A | 5/1996 | Naito | |
| 5,518,566 A | 5/1996 | Bridges et al. | |
| 5,751,394 A * | 5/1998 | Masunaga | ................... 351/118 |
| 5,818,567 A | 10/1998 | Sakai | |
| 6,033,069 A | 3/2000 | Lee | |
| 6,070,978 A | 6/2000 | Temming | |

FOREIGN PATENT DOCUMENTS

EP       0 256 098 B1    4/1993

(Continued)

*Primary Examiner*—Hung Xuan Dang
(74) *Attorney, Agent, or Firm*—Sughrue Mion, PLLC

(57) ABSTRACT

A spectacle frame comprises at least one lens engaging frame member and a pair of temple members. An end piece of a temple member is pivotally connected with an end piece of the frame member by a hinge assembly (5) comprising relatively short, elongate first and second hinge members (6, 7) pivotally interconnected to confine relative movement of the hinge members substantially to rotational movement about a single axis of rotation. Frame members comprising wire pieces (2, 3) framing upper and lower rims of the lenses (1) form outside each of said peripheral lens edges two wire end pieces (2a, 3a) for connection with said first hinge member (6), whereas each temple member (4) comprises two interconnected wire pieces (4a, 4b) extending side by side to provide a cross-sectional profile of the temple member substantially in shape of the digit 8. The first hinge member (6) is formed at one end (11) with separate holes (8, 9) for insertion and retainment of the wire end pieces (2a, 3a) of the frame members and the second hinge member (7) is formed at one end (12) with a hole (10) having a cross-section profile fitting with said cross-sectional profile of the temple member.

3 Claims, 3 Drawing Sheets

FOREIGN PATENT DOCUMENTS

Figure 4:
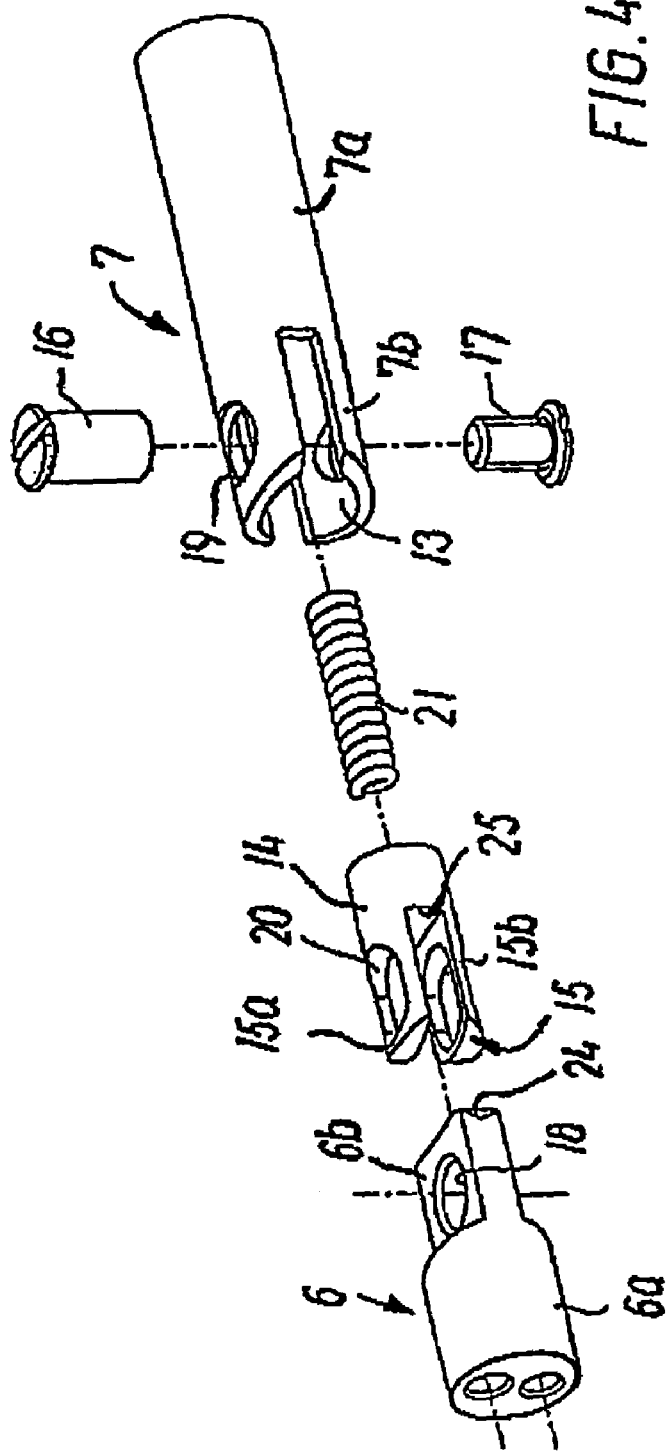

| | | |
|---|---|---|
| EP | 0 546 589 A1 | 6/1993 |
| EP | 0 978 749 A1 | 2/2000 |
| WO | WO 92/08158 | 5/1992 |
| WO | WO 97/23803 | 7/1997 |
| WO | WO 00/72081 A1 | 11/2000 |
| WO | WO 02/50602 A1 | 6/2002 |

* cited by examiner

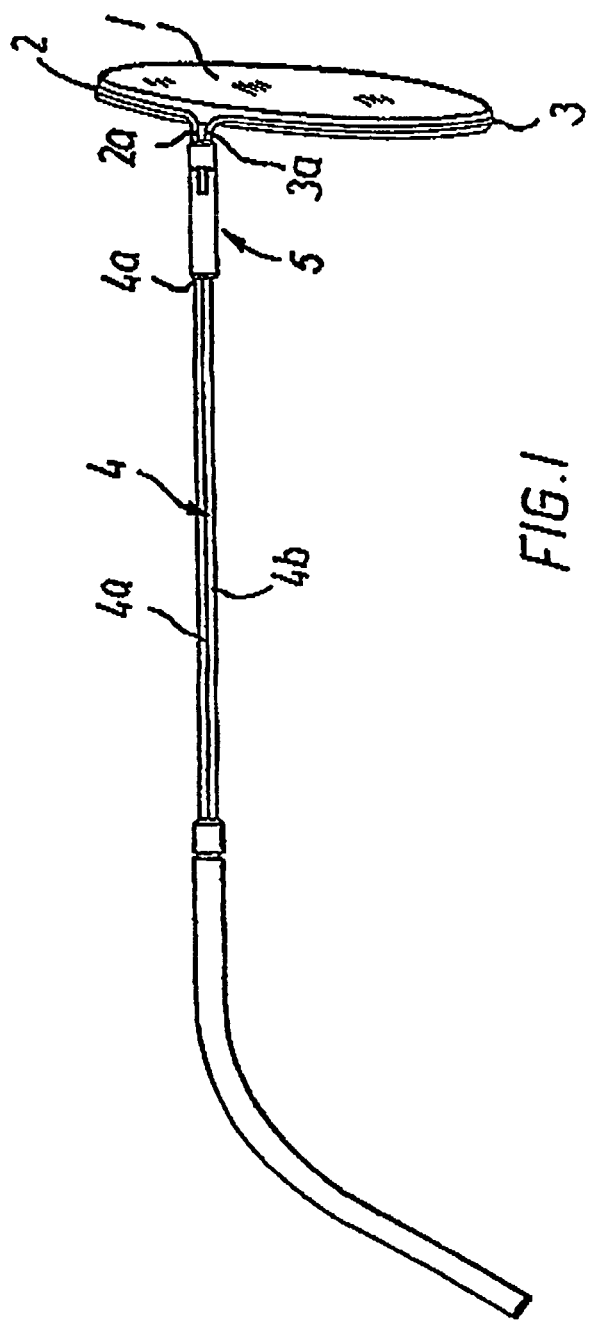
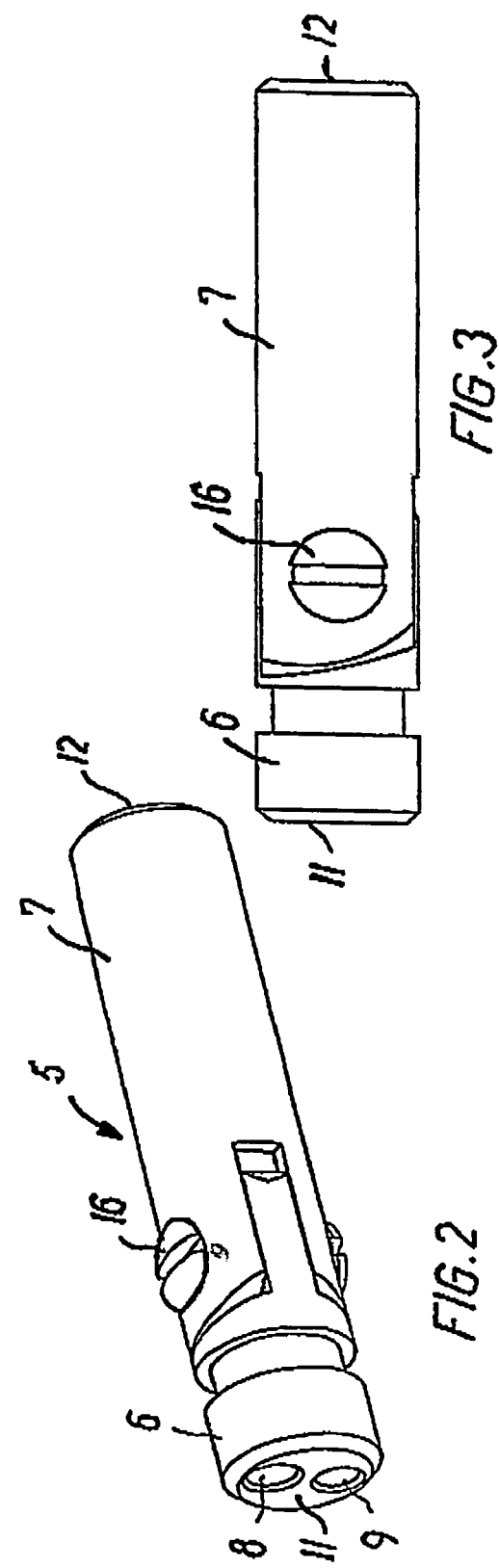

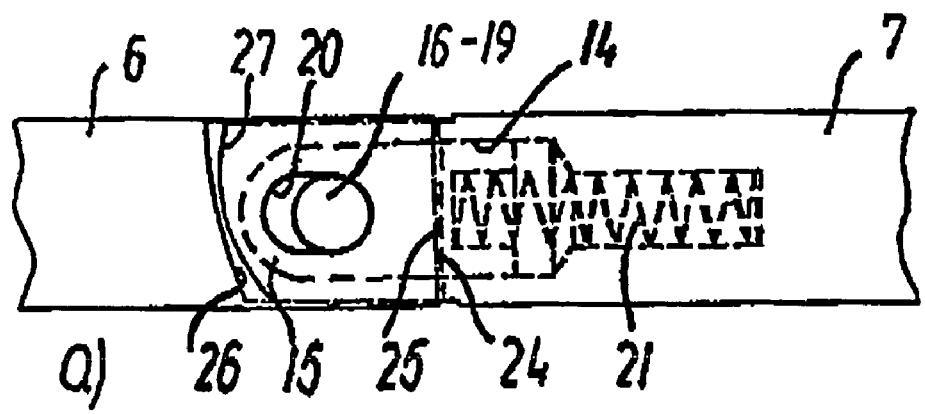
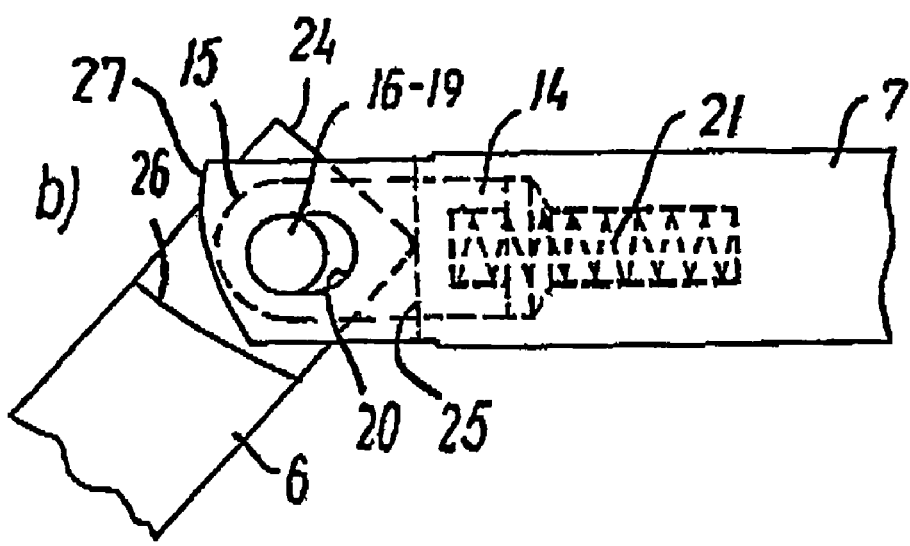
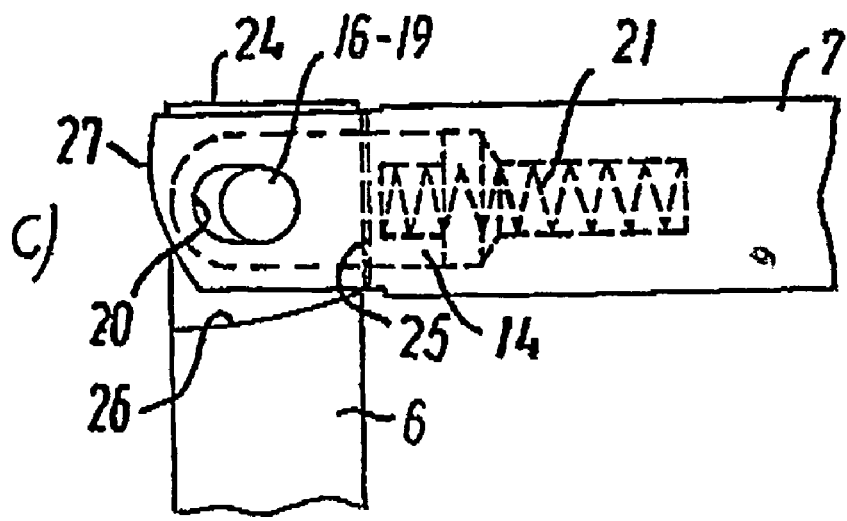
FIG.6

SPECTACLE FRAME

The present invention relates to a spectacle frame comprising at least one lens engaging frame member having end pieces projecting outside a peripheral edge of each of a pair of lenses and a pair of temple members each having an end piece pivotally connected with one of the end pieces of said frame member by a hinge assembly comprising first and second hinge members for connection with said frame and temple member end pieces, respectively, said first and second hinge members being pivotally interconnected to confine movement of each temple member substantially to rotational movement about a single axis of rotation between an open position of use and a folded position with the temple members extending substantially parallel to the pair of lenses, whereby the frame and temple members are made of wire material and the first and second hinge member comprise substantially cylindrical first and second body parts, each provided at one end thereof with connecting means for said end pieces of the frame and temple members, respectively.

Whereas the spectacle frame and the hinge assembly of the invention may generally be used for a great variety of spectacle or eyeglass designs and materials for use therein, the invention is useful in particular for spectacle designs with frame and temple members of light weight wire material such as titanium or a titanium alloy.

Such spectacle designs are well known in the art in rimless, half-rimmed and full-rimmed versions and have gained increasing popularity due to their high strength and very low weight and the comfort in use resulting there from.

Examples of full-rimmed spectacle frames made from titanium wire are disclosed e.g. in EP-B1-0 256 098, EP-B1-0 546 589, U.S. Pat. No. 5,518,566, WO 92/08158 and WO 97/23803.

From a design point such spectacle frames are attractive by offering the possibility of a very discrete framing of eye glass lenses covering a minimum of the users' face, but when made of titanium wire also the possibility of an appealing design due to the ability of titanium wire material to be coloured by an electrical process to meet users individual tastes.

Together with the possibility of making such spectacle frames in a rimless design, where small wire pieces connected with the temple members are fixed in slits or holes formed directly in the lenses, as well as in full-rimmed and half-rimmed versions these design options provide for a relatively wide range of frame designs to meet individual needs and tastes of users.

From a mechanical strength aspect the hinge assemblies serving to provide pivotal connections between each of the temple members and the lens engaging frame member or members are vital parts of the structure of such spectacle frames. On one hand, the hinge assemblies underlie the same geometrical constraints as made to conventional spectacle frames in the sense that they must allow pivotal movement of the temple members from a folded position, in which they extend overlapping each other close to and substantially parallel with the lenses, to the position of use, in which they extend substantially at right angles to the lenses at either side of the frame structure. On the other hand, a hinge assembly for use in a spectacle frame must provide a stop for the pivotal movement of the temple member connected therewith to provide a geometrically well-defined and stable position of use.

To meet these requirements as well as the desirability for the hinge assemblies to match the wire design for the frame and temple members use is made in the prior art frame structures disclosed in the above-mentioned patent publications of hinge assemblies made entirely of the same wire material as the frame and temple members. Typically, such a hinge assembly comprises as one hinge part a central straight pintle wire portion formed e.g. by a frame member and as the other hinge part a coil wound wire portion formed e.g. by a temple member and surrounding the pintle portion. The two parts are materially separated such that they are freely rotatable with respect to each other within normal limits without the coil portion acting as a torsion spring. The coil portion is axially held between wire portions bent out from opposed ends of the pintle wire portion and a rotation stop for the temples is provided by a free wire end at one end of the coil portion.

Besides adding a somewhat "technical" outlook that may be felt by users to detract from the otherwise attractive appearance of spectacle frames of wire material, such hinge assemblies are often flimsy and resilient and, in result, often felt wobbly and unstable in use. This wobbly and unstable function of prior art titanium wire frame is in fact further pronounced due to flimsy and resilient character of the wire temples. Moreover, there is no possibility to compensate for such instability by tightening of the hinge assembly, as is the case with conventional spectacle hinges using a screw as fulcrum for the pivotal movement.

From EP-A1-0 978 749 another design of a hinge assembly for use in wire-framed spectacles is known, in which free end parts of a frame member and a temple member are bent into bow or hook shape and fitted into bores in a common relatively bulky hinge block. With this design the pivotal movability of the frame and temple members with respect to each other relies on the possibility of the bent end parts to turn with respect to the hinge block, whereby the hinge assembly will appear wobbly and unstable in use.

A spectacle frame having a hinge assembly with first and second hinge members as defined above is known from WO 00/72081.

On this background, it is the object of the invention to provide a spectacle frame of the kind defined that will ensure safe connection of the frame and temple members and steady and reliable movement of the temple members between their folded position and a well-defined add stable position of use, while preserving the attractive appearance of wire-rimmed spectacles of the kind set forth, including by the use of titanium or a titanium alloy for the wire material the possibility of colouring the entire spectacle frame including the hinge assemblies in the full range of colours attainable by electrical treatment of such materials.

According to the invention, a spectacle frame of the kind defined is characterized in that frame members comprising wire pieces framing upper and lower rims of the lenses 1 form outside each of said peripheral lens edges two wire end pieces for connection with said first hinge member, and that each temple member comprises two interconnected wire pieces extending side by side to provide a cross-sectional profile of the temple member substantially in shape of the digit 8, the first hinge member being formed at said one end with separate holes-for insertion and retainment of the wire end pieces of the frame member and the second hinge member being formed at said one end with a hole having a cross-sectional profile fitting with said cross-sectional profile of the temple member.

According to a particularly preferred embodiment, the second hinge member comprises integrated spring means to provide a spring assisted snap action during a final part only of the movement of said temple member from said folded position to said position of use and vice versa.

In the following the invention will be described in more detail by way of a preferred although non-limiting embodiment as shown in the accompanying drawings, in which FIG. 1 is a side plan view of a pair of spectacles embodying the frame and hinge assembly design of the invention, FIGS. 2 to 5 show a preferred embodiment of a hinge assembly according to the invention seen in an external perspective view, top plan view, an exploded perspective view and a longitudinal sectional view, respectively, and FIGS. 6a to c are schematic views illustrating the functional relationship between components of the hinge assembly in FIGS. 2 to 5 in a position of, use and a folded position of the spectacle frame as well as in an Intermediate position occupied by said components during movement of the spectacle frame from the position of use towards the folded position and vice versa.

In the full-rimmed spectacle design illustrated is by way of embodiment in FIG. 1 an eye glass lens 1 is engaged along its upper and lower peripheral edges by a first lens engaging wire member 2 and a second lens engaging wire member 3, respectively. Between the lenses the upper frame member 3 is bent in a manner not illustrated to provide a nose bridge.

The spectacle design illustrated in FIG. 1 is generally of the same character as described and shown in the applicant's co-pending International Patent Application WO 02/50602, the disclosure of which is incorporated herein by reference.

Outside the outer peripheral side edge of the lens 1 free end pieces 2a and 3a, of wire members 2 and 3 are bent substantially into L-shape under an angle, such that the extreme section of an end part will project substantially at right angles to the geometrical plane of lens 1. The end pieces 2a and 3a are pivotally connected with an end piece 4a of a temple members 4, which in the illustrated embodiment is formed from two interconnected wire pieces 4b and 4c of the same wire material as used for the frame members 2 and 3, by means of a hinge assembly generally designated by 5.

As more clearly seen in FIGS. 2 to 5 each of hinge assemblies 5 comprises two hinge members 6 and 7, which are firmly connected with the end pieces 2a and 3a of the first and second frame members 2 and 3 and with the end piece 4a of the temple member 4.

In the illustrated embodiment a firm connection between a hinge member 6 or 7 and the end piece 2a to 4a of the associated frame or temple members is provided by making the hinge member of substantially the same material as the wire material used for the frame and temple members and forming in the hinge member a bore for accommodation of each of the associated frame or temple member end pieces to be connected therewith. A firm connection of the hinge member 6, 7 with the frame or temple member end pieces may thus be provided e.g. by means of a firm frictional fit, by adhesive bonding or by welding as known in the art.

As illustrated in FIGS. 2 to 5, each of hinge members 7 and 8 is preferably formed as a relatively short elongate member having a generally circular cross-sectional shape. The diameters of the hinge members are kept at a minimum to provide optimum matching of the hinge members to the wire material used for the frame and temple members.

In the illustrated embodiment, the hinge members may thus be formed as solid cast members of titanium as used for the wire material of the frame and temple members or of a titanium alloy of substantially the same composition as a titanium alloy used for the frame and temple members.

In the illustrated embodiment the hinge member 6 connected with the end pieces 2a and 3a of frame members 2 and 3 are formed with two distinct bores 8 and 9, respectively, with parallel axes for separate accommodation of each of said end pieces. Alternatively, the bores 8 and 9 may, however, be open towards each other to provide a substantially 8-shaped bore cavity or a single bore of oblong cross-sectional shape may be formed in hinge member 6 for joint accommodation of both of end pieces 2a and 3a. In the other hinge member 7 a single bore 10 is formed for accommodation of the end pieces such as 4a of the temple member 4. In the illustrated embodiment the temple member 4 is formed from two interconnected wire pieces 4a and 4b extending one above the other to provide a cross-sectional profile substantially in the shape of the digit 8, whereby considerable enhanced rigidity and stability of the temple member is provided compared to a temple member made from a single wire section of a small diameter circular cross section. For accommodation of such a temple member end piece 4a the bore 10 is formed with a corresponding 8-shaped cross-section. The bores 8, 9 and 10 are formed as blind bores opening in end face 11 and 12 of the respective hinge members 6 and 7.

In general terms, the hinge assembly comprising hinge members 6 and 7 is of a type disclosed in WO 00/72081, the disclosure of which is incorporated herein by reference.

Figure 5:
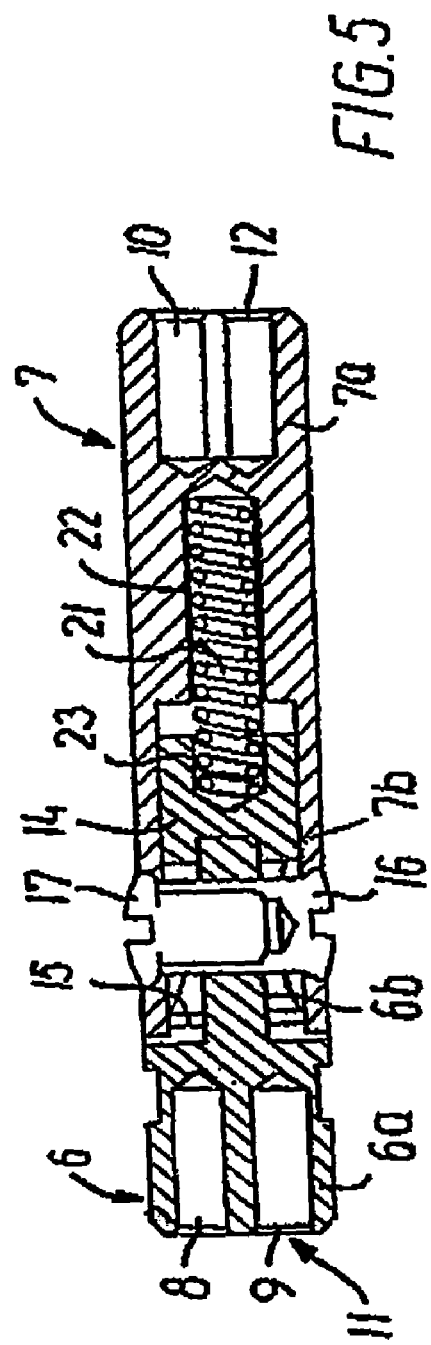

As more clearly shown in the exploded an cross-sectional views in FIGS. 4 and 5 the hinge members 6 and 7 comprise substantially cylindrical body parts 6a and 7a, each of which is provided at one end face 11 and 12, respectively, with connecting means such as the bores 8, 9 and 10, respectively, for the frame and temple member end pieces 2a, 3a and 4a.

At the opposite end the body part 6a is formed with a connecting means, which in the illustrated embodiment is formed as a substantially rectangular rib-like end part 6b.

At the opposite end with respect to the end face 12 the second body part 7a is formed with a blind bore 13, in which an insert member 14 is arranged to be axially displaceable. The insert member 14 is formed at one end with a connecting means, which in the illustrated embodiment is formed as a bifurcated fork-like end part 15 with branches 15a and 15b mating the rib-like connecting means 6b of the first body part 6.

In the illustrated embodiment the fulcrum for the rotational movement of hinge members 6 and 7 with respect to each other is provided, as shown in FIG. 4, by shaft means comprising a tubular bushing member 16 with internal thread and a screw member 17 arranged in aligned holes 18 to 20, formed in the rib-like end part 6b of the hinge member 6, the wall part 7b surrounding the blind bore 13 in the hinge member 7 and in each of the branches 15a and 15b of the fork-like end part 15 of the insert member 14. Whereas the holes 18 and 19 provided in the rib-like end part 6b of hinge member 6 and in the wall part 7b of hinge member 7 are conventional circular holes, the holes 20 formed in the branches 15a and 15b of the fork-like end part 15 of the insert member 14 are elongate in shape to allow axial displacement of the insert member 14 in the bore 13.

The second hinge member 7 comprises integrated spring means to provide a snap action during a final part only of the movement of the temple member 4 from a folded position, in which the temple member extends substantially parallel to the geometrical plane of the lens 1 to the position of use, in which the temple member 4 is substantially at right angles with respect to said geometrical lens plane, and vice versa.

The integrated spring means of the second hinge member 7 comprises a helical spring 21 with respective ends retained in blind bores 22 and 23 from the bottom of the bore 13 and in the insert member 14 displaceably arranged therein.

In the illustrated embodiment, the snap action to be effected by the spring means during a final part only of any of the above-mentioned movement of the temple member 4 with respect to the geometrical lens plane is accomplished by engagement between contact faces provided by the first hinge member 6 and the insert member 14.

Thus, a first contact face is provided by the end edge 24 of the rib-like end part 6b of the first hinge member 6 and a second contact face by a bottom face 25 of the insert member between the branches 15a and 15b of the fork-like end part 15 thereof.

The function of the integrated spring means in connection with movement of the temple member 4 from the open position of use of the spectacle frame and the folded position and vice versa will appear from the schematic views in FIG. 6.

In the position of use illustrated in FIG. 6a) the helical spring 21 assumes ad substantially unstressed position between the bottom of the blind bore 13 in the body part 7a of the hinge member 7 and, due to the spring-action the insert member 14 is displaced in the bore 13 in the direction towards the first hinge member 6 which in this position is axially aligned with the second hinge member 7 as also shown in FIGS. 1 to 5. In this position the contact faces 24 and 25 are mutually engaged in face to face to position. A conventional end stop for rotation of the temple member 4 beyond its position of use substantially at right angles the geometrical plane of the lenses 1 is provided by engagement of a second pair of curved co-operating faces 26 and 27 formed by the first hinge member 6 at the transition between the body part 66a and the rib-like end part 6b and by the end faces of the wall part 7b of the second hinge member 7 surrounding the bore 13.

By initial movement of the second hinge member 7 connected with the temple member 4 in the direction of folding of the temple member as illustrated in FIG. 6b), the insert member 14 will be forced by the engagement between the contact surfaces 24 and 25 to be displaced against the spring action from the helical spring 21, which will thereby be compressed. After movement of the second hinge member 7 through a certain part, typically about 60 to 65 of the full angular range of about 90 between the position of use and the folded position, the spring action on the insert member 14 will complete the movement towards the folded position by a swift snap action resulting from the engagement of the contact surface 25 with the corner 24a of the contact surface 24.

In the folded position illustrated in FIG. 6c) the hinge members 6 and 7 are at substantially right angles to each other and the helical spring 21 has returned to its substantially unstressed position.

For the reverse movement of the temple member 4 from the folded position illustrated in FIG. 6c) towards the position of use illustrated in FIG. 6a), initial turning of the hinge member 7 will again result in displacement of the insert member 14 against the spring action as illustrated in FIG. 6b) and in the final stage of the movement the hinge member 7 will be moved in to the position of use by a swift spring action as described.

The invention claimed is:

1. A spectacle frame comprising at least one lens engaging frame member (2, 3) having end pieces (2a, 3a) projecting outside a peripheral edge of each of a pair of lenses (1) and a pair of temple members (4) each having an end piece (4a) pivotally connected with one of the end pieces (2a, 3a) of said frame member (2, 3) by a hinge assembly (5) comprising first and second hinge members (6, 7) for connection with said frame and temple member end pieces (2a–4a), respectively, said first and second hinge members (6, 7) being pivotally interconnected to confine movement of each temple member (4) substantially to rotational movement about a single axis of rotation between an open position of use and a folded position with the temple members (4) extending substantially parallel to the pair of lenses (1), whereby the frame and temple members (2–4) are made of wire material, and the first and second hinge members (6, 7) comprise substantially cylindrical first and second body parts (6a, 7a), each provided at one end thereof with connecting means (8, 9, 10) for said end pieces (2a–4a) of the frame and temple members (2–4), respectively, characterized in that frame members comprising wire pieces (2, 3) framing upper and lower rims of the lenses (1) form outside each of said peripheral lens edges two wire end pieces (2a, 3a) for connection with said first hinge member (6), and that each temple member (4) comprises two interconnected wire pieces (4a, 4b) extending side by side to provide a cross-sectional profile of the temple member substantially in shape of the digit 8, the first hinge member (6) being formed at said one end (11) with separate holes (8, 9) for insertion and retainment of the wire end pieces (2a, 3a) of the frame member and the second hinge member (7) being formed at said one end (12) with a hole (10) having a cross-sectional profile fitting with said cross-sectional profile of the temple member.

2. A spectacle frame as claimed in claim 1, characterized in that the frame and temple members (2–4) are made from titanium or a titanium alloy, and that first and second hinge members (6, 7) comprises solid cast members of titanium or a titanium ally.

3. A spectacle frame as claimed in claim 1 or 2, characterized that the second hinge member (7) comprises integrated spring means (21) to provide a spring assisted snap action during a final part only of the movement of said temple members (4) from said folded position to said position of use and vice versa.

* * * * *